(12) United States Patent
Young

(10) Patent No.: US 6,408,354 B1
(45) Date of Patent: Jun. 18, 2002

(54) DATA CHANNEL ARCHITECTURE FOR PARALLEL SCSI HOST ADAPTERS

(75) Inventor: B. Arlen Young, Palo Alto, CA (US)

(73) Assignee: Adaptec, Inc., Milpitas, CA (US)

( * ) Notice: Subject to any disclaimer, the term of this patent is extended or adjusted under 35 U.S.C. 154(b) by 0 days.

(21) Appl. No.: 09/275,652

(22) Filed: Mar. 24, 1999

(51) Int. Cl.[7] .............................................. G06F 13/20
(52) U.S. Cl. ...................................... 710/313; 710/310
(58) Field of Search ........................... 710/5, 129, 126, 710/305, 306, 310, 313

(56) References Cited

U.S. PATENT DOCUMENTS 5,584,041 A * 12/1996 Odawara et al. ............... 710/14
6,157,964 A * 12/2000 Young ............................ 710/5
6,253,272 B1 * 6/2001 Young ........................ 710/129

* cited by examiner

Primary Examiner—Glenn A. Auve

(74) Attorney, Agent, or Firm—Gunnison, McKay & Hodgson, L.L.P.; Forrest Gunnison

(57) ABSTRACT

A parallel host adapter that interfaces two I/O buses includes at least two independent data channels, a receive data channel and a send data channel. The receive data channel supports at least two data contexts. The parallel host adapter also includes an administrative information channel that couples one of the I/O buses to a memory where administrative information for the parallel host adapter is stored. The send data channel includes a send buffer memory, and a data transfer engine. The data transfer engine is coupled to a first port of the send buffer memory and to a first I/O bus coupled to the parallel host adapter. The send buffer memory is a single data context buffer memory. The receive data channel includes a receive buffer memory, and another data transfer engine. The another data transfer engine is coupled to the first I/O bus and to a first port of the receive buffer memory. Data for a first data context is transferred from the second I/O bus to the receive buffer memory through a second port of the receive buffer memory. The data in the first data context is transferred from the receive buffer memory to the first I/O bus by the another data transfer engine. As this is happening, data from a second data context can be transferred from the second I/O bus to the receive buffer memory. Also, as the receive buffer memory is emptying, the send buffer memory may be receiving data.

27 Claims, 3 Drawing Sheets

DATA CHANNEL ARCHITECTURE FOR PARALLEL SCSI HOST ADAPTERS

BACKGROUND OF THE INVENTION

1. Field of the Invention

This invention relates generally to host adapter integrated circuits for interfacing I/O buses, and more particularly to data channels for a parallel host adapter integrated circuit.

2. Description of Related Art

A variety of parallel host adapter architectures is available. See for example, U.S. Pat. No. 5,655,147 or U.S. Pat. No. 5,659,690. Each parallel host adapter provides connectivity between two I/O buses, e.g., a parallel SCSI bus to a host I/O bus, such as a PCI bus.

Originally, a parallel host adapter typically had a single channel that handled both data and administrative information. Data was either read from a memory of the host computer and written to a SCSI device, or read from a SCSI device and written to the memory of the host computer over the single channel. Administrative information that was transferred to and from the host computer memory using the single channel was used internally by the parallel host adapter in the course of managing data transferred, and included sequencer command blocks (SCBs), scatter/gather information, and command completion status.

Hence, data, as used herein, refers to information that is written to, or read from a storage device. Administrative information is information that is used to control the transfer of data, and to control operation of the parallel host adapter.

The use of a single channel for both data and administrative information limited the data transfer throughput. Consequently, a new architecture was introduced that separated the administrative information flow from the data flow. A high level block diagram of a parallel host adapter 100 that separated the channel architecture into an administrative information channel 101, and a data channel 102, is illustrated in FIG. 1.

Administrative information was transferred to and from the host I/O bus via administrative information channel 101. Administrative information channel 101 coupled a SCSI array memory 160 to PCI bus 110. Specifically, in channel 101, a command direct memory access (DMA) engine 151 coupled PCI bus 110 to SCSI array memory 160. SCSI array memory 160 could be either memory onboard the parallel host adapter, or memory external to the parallel host adapter.

Data channel 102 coupled SCSI bus 120 to PCI bus 110 so that data could be transferred between the two buses. A SCSI module 130 coupled SCSI bus 120 to a first-in-first-out (FIFO) data buffer 140. SCSI module 130 transferred data on SCSI bus 120 to FIFO data buffer 140, and transferred data from FIFO data buffer 140 to SCSI bus 120.

A data DMA engine 150, typically included in a host interface circuit within the parallel host adapter, coupled FIFO data buffer 140 to PCI bus 110. Data DMA engine 150 transferred data on PCI bus 110 to FIFO data buffer 140, and transferred data from FIFO data buffer 140 to PCI bus 110. As is known to those of skill in the art, DMA engines 151 and 150 were typically configured by an onboard sequencer (not shown) using administrative information stored in SCSI array 160.

The channel configuration of FIG. 1 enabled the concurrent flow of data and administrative information in contrast to the earlier single channel configuration that allowed only the flow of one or the other at a given instant in time. However, both the prior art channel configurations allowed only one data context in the data channel at a time. As used here, data context means data transfers associated with a particular command, e.g., a particular SCB.

FIFO data buffer 140 was designed to minimize the time that parallel host adapter 100 required access to PCI bus 110, and to accept data from SCSI bus 120 without introducing, delay on SCSI bus 120. For example, in a receive operation where data was transferred from SCSI bus 120 to PCI bus 110, data from SCSI bus 120 was collected in FIFO data buffer 140 until there was sufficient data in FIFO data buffer 140 to justify requesting access to PCI bus 110. Typically, data was burst to the host from FIFO data buffer 140 using the highest speed PCI transfer mode.

As SCSI bus data transfer rates increased, typically, the size of FIFO data buffer 140 also increased to maintain or even improve the PCI efficiency, and to prevent SCSI bus stalls. However, the larger size of FIFO data buffer 140 required a longer time for buffer 140 to complete a transfer to the host, i.e., a longer time to empty, when the SCSI bus data transfer was either suspended or completed.

FIFO data buffer 140 was unavailable for another data transfer until emptying of buffer 140 was completed. Consequently, another data context was allowed access to channel 102 only after the previous data context was completely flushed out of channel 102. In some cases, the delay introduced by the wait for flushing of channel 102 was five microseconds or more.

During this time delay, another SCSI device could be ready to transfer data to parallel host adapter 100, but the transfer was held off while buffer 140 was flushing. This resulted in an appreciable time delay on SCSI bus 120. Hence, while parallel host adapter 100 was an improvement over the single channel parallel host adapter, the data throughput could still introduce significant delays because a new data context was delayed until the old data context was flushed from the data channel. As I/O bus speeds increase, further advances in parallel host adapter data throughput are required, or the parallel host adapter will because a major I/O bottleneck that will limit overall system performance.

SUMMARY OF THE INVENTION

According to the principles of this invention, a new parallel host adapter channel architecture eliminates the I/O bottlenecks of the prior art parallel host adapters. The novel parallel host adapter channel architecture includes a plurality of data channels. In one embodiment, at least one dedicated receive data channel in the plurality supports multiple data contexts at the same time. In another embodiment, each of the plurality of data channels is a bi-directional data channel. The parallel host adapter channel architecture of this invention provides a new level of data throughput that is compatible with, and enhances the performance on high speed I/O buses by eliminating the prior art I/O bottleneck.

According to the principles of this invention, a parallel host adapter that interfaces two I/O buses includes at least two data channels that can be used concurrently as a receive data channel and a send data channel, or alternatively, in one embodiment, as two receive channels. When the two data channels are a dedicated receive data channel and a dedicated send data channel, the receive data channel supports at least two data contexts. This permits the parallel host adapter to transmit an old data context to one of the I/O buses at the same time that the parallel host adapter is receiving a new data context from the other of the I/O buses.

In one embodiment, the parallel host adapter of this invention also includes an administrative information channel that couples one of the I/O buses to a memory where administrative information for the parallel host adapter is stored.

The dedicated send data channel of this invention includes a send buffer memory and a data transfer engine. The data transfer engine is coupled to a first port of the send buffer memory and to a first I/O bus coupled to the parallel host adapter. The send buffer memory is a single data context buffer memory.

Data is transferred from the first I/O bus to the send buffer memory by the data transfer engine. The data stored in the send buffer memory is transferred through a second port of the send buffer memory through a second I/O bus interface circuit to a second I/O bus coupled to the parallel host adapter, or alternatively purged depending on the event or events that occur on the second I/O bus. The second I/O bus interface circuit is connected to the second I/O bus via a single I/O bus data port. Moreover, the data is transferred to the second I/O bus through the second I/O bus data port.

The dedicated receive data channel of this invention includes a receive buffer memory and another data transfer engine. The another data transfer engine is coupled to the first I/O bus and to a first port of the receive buffer memory.

Data for a first data context is transferred from the second I/O bus through the second I/O bus interface circuit data port to the receive buffer memory through a second port of the receive buffer memory. The data in the first data context is transferred from the receive buffer memory to the first I/O bus by the another data transfer engine. As this is happening, data from a second data context can be transferred from the second I/O bus to the receive buffer memory. Hence, the receive buffer memory of this invention is a multiple data context receive buffer memory.

The dual data channels of this invention coupled with the multiple data context receive buffer memory provides a new level of performance that was previously unavailable in SCSI parallel host adapters. This new level of performance is achieved by eliminating the I/O bottlenecks of the prior art SCSI parallel host adapters. For example, the parallel host adapter of this invention can empty the receive buffer memory, and at the same time be filling the send buffer memory by interleaving the transactions on the first I/O bus.

BRIEF DESCRIPTION OF THE DRAWINGS

In the specification, elements with the same reference number are the same element. In addition, the first digit of a reference number for an element is the number of the Figure in which the element first appears.

DETAILED DESCRIPTION OF THE INVENTION

Figure 1:
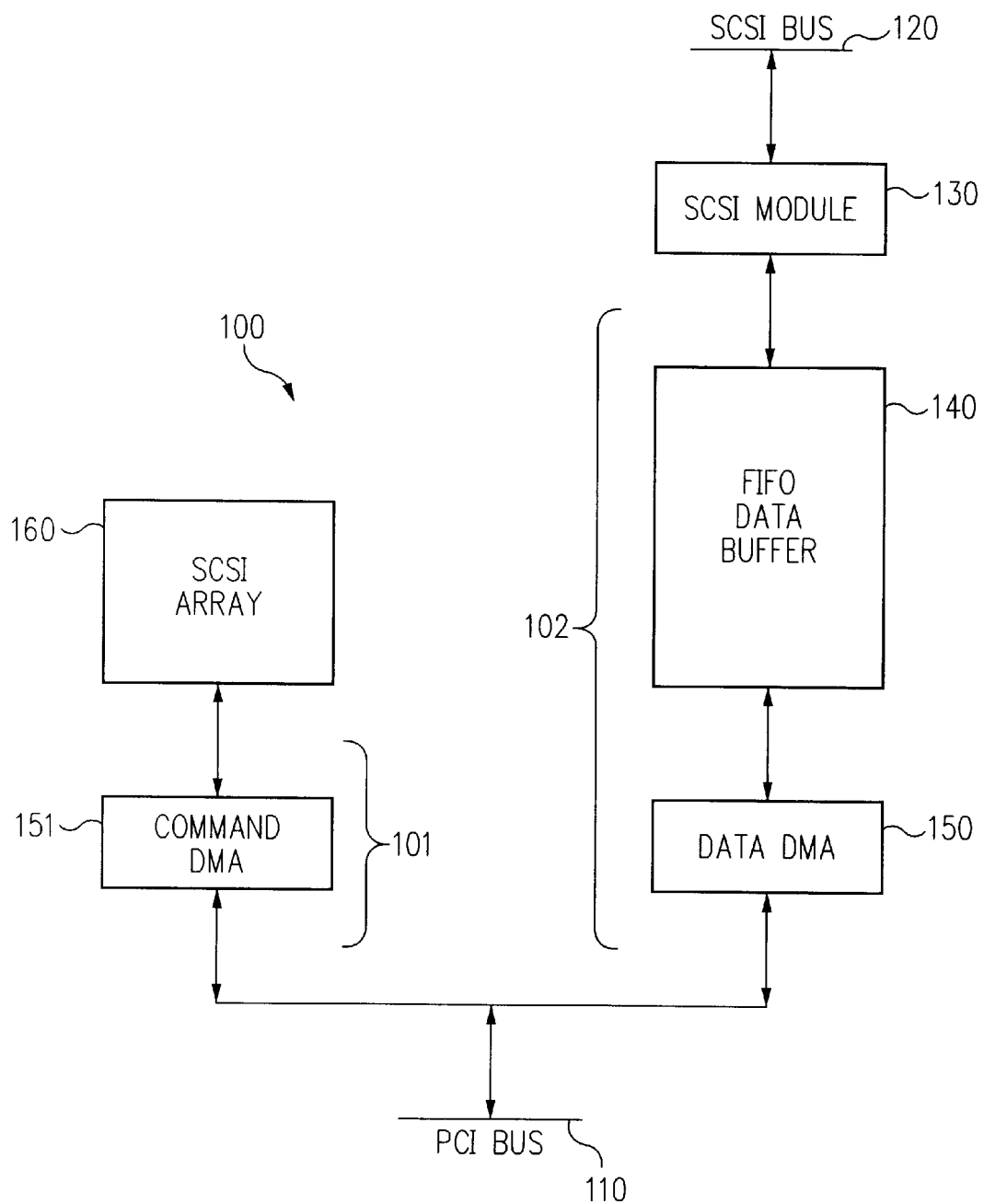
FIG. 1 is a block diagram of a portion of a prior art parallel host adapter integrated circuit that included a single data channel that supported only a single data context at a time.

According to the principles of this invention, a new parallel host adapter channel architecture eliminates the shortcomings of the prior art parallel host adapters. The novel parallel host adapter channel architecture supports multiple data contexts at the same time, and removes the I/O bottlenecks of the prior art parallel host adapter architectures. Consequently, the parallel host adapter channel architecture of this invention provides a new level of data throughput that is compatible with, and enhances the performance on high speed I/O buses by eliminating the prior art I/O bottlenecks. As used herein, a parallel host adapter is a host adapter that has a single data port connected to the I/O bus for both send and receive operations.

According to the principles of this invention, a parallel host adapter integrated circuit 200, hereinafter parallel host adapter 200, that interfaces two I/O buses 110 and 120 includes at least three channels, an administrative information channel 201, a dedicated receive data channel 202, hereinafter, receive data channel 202, and a dedicated send data channel 203, hereinafter, send data channel 203. Moreover, in one embodiment, receive data channel 202 supports at least two data contexts, e.g. data 205 for an old data context, and data 206 for a new data context.

Figure 2:
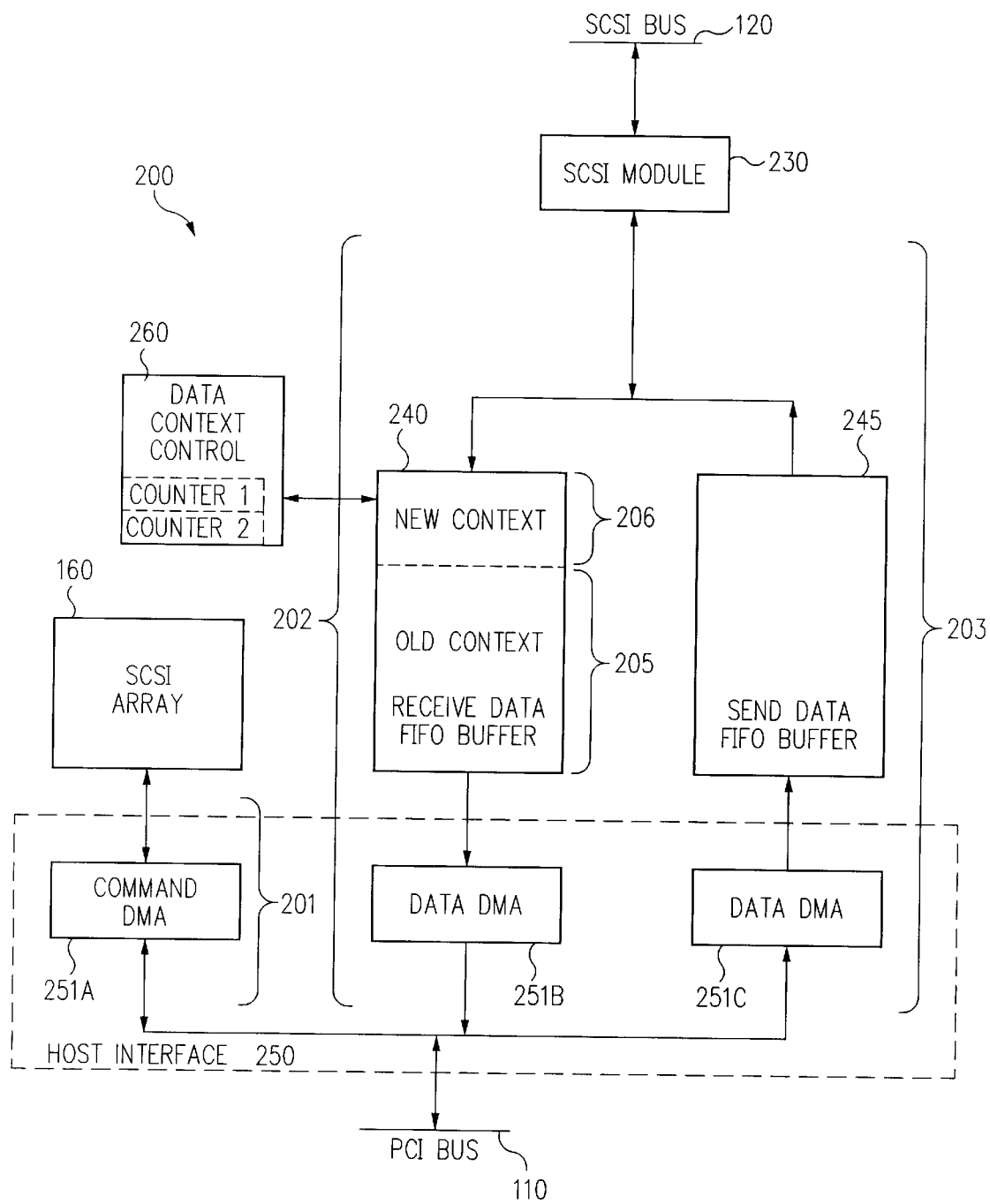
FIG. 2 is a diagram of a parallel host adapter with a first embodiment of the novel channel architecture of this invention.

While it is not illustrated in FIG. 2, those of skill in the art will appreciate that a plurality of storage devices, other host adapters, etc. may be connected to bus 120. See for example FIGS. 1 to 3 of U.S. Pat. No. 5,659,690, which is incorporated herein by reference in its entirety. Those of skill in the art also will understand that parallel host adapter 200 includes other circuitry and storage that are used in the operation of parallel host adapter 200 including an on-chip sequencer that controls the operation of parallel host adapter 200. However, these components are similar to those of the prior art and so are not considered except to the extent required to implement this invention, as described more completely below. Also, the components are not shown in the drawings to avoid distracting from the features of this invention.

Administrative information channel 201 includes an information transfer engine, e.g., a command DMA engine 251A in host interface circuit 250, that couples PCI bus 110 to a command block array in a SCSI array memory 160. Administrative information channel 201 is similar to administrative information channel 101. Consequently, the structure and operation of administrative information channel 201 is known to those of skill in the art.

In a receive operation, e.g., in a first Data In phase on SCSI bus 120, where data is transferred from SCSI bus 120 to PCI bus 110, i.e., from a second I/O bus to a first I/O bus, SCSI module 230 passes data from SCSI bus 120 to receive data FIFO buffer 240, i.e., to a receive data buffer memory. In one embodiment, the size of receive data FIFO buffer 240 is selected to support bursting of data on PCI bus 110 using the highest speed PCI transfer mode by a first data DMA engine 251B, e.g., a first data transfer engine, in host interface module 250, and to support multiple data contexts, as described more completely below.

Since receive data channel 202 is used only for receiving data, data can be transferred from receive data FIFO buffer 240 by PCI bus 110 at the same time that data is being received in send data FIFO buffer 245 from a host over PCI bus 110. Therefore, it is no longer necessary for parallel host adapter 200 to wait until a receive operation has completed before initiating a send operation. The capability to handle a send operation and a receive operation in parallel, i.e., at the same time, provides a new level in performance over the prior art parallel host adapters described above.

The reason that a send operation and a receive operation can proceed in parallel in parallel host adapter 200 of this invention is that send data channel 203 has its own send data FIFO buffer 245. Thus, it is unnecessary to wait until buffer 240 is emptied to start a send data context.

As illustrated in FIG. 2, a second data DMA engine 251C, e.g., a second data transfer engine, transfers data from a host over PCI bus 110 to send data FIFO buffer 245. Therefore, data can be immediately transferred from a host to a SCSI device without waiting for data from a device previously connected to SCSI bus,120 to finish draining from buffer 240 to the host. Old context data 205 in receive data FIFO buffer 240 can be draining from buffer 240 concurrently with new context data filling send data FIFO buffer 245 by interleaving data bursts of the two data contexts on PCI bus 110.

Those of skill in the art will appreciate that when data is referred to as being transferred to a particular I/O bus, the data is transferred through the single I/O bus data port of the parallel host adapter integrated circuit for that particular I/O bus. Therefore, in this description, the transfers through the I/O bus data ports are understood to be a part of the transfer of data to an I/O bus.

To further enhance the performance of the parallel host adapter channel architecture of this invention, receive channel 202 supports multiple data contexts. For example, in one embodiment, a first data context is flowing from buffer 240 via data DMA engine 251B to PCI bus 110, a second data context is stored in buffer 240 following the first data context, and a third data context is flowing into buffer 240 from SCSI bus 120 through SCSI module 230.

Alternatively, in another embodiment, as shown in FIG. 2, parallel host adapter 200 supports only two data contexts for buffer 240, data 205 for an old data context, and data 206 for a new data context. Therefore, according to the principles of this invention, receive data channel 202 supports at least two data contexts.

Following a SCSI phase change out of a Data In phase, data from that phase continues to drain from receive data FIFO buffer 240 to the host over PCI bus 110. The time required to completely empty buffer 240 can be appreciable compared with the time when data from another SCSI device becomes available on SCSI bus 120. Dual context receive data FIFO buffer 240 enables a new context data on SCSI bus 120 to start flowing into buffer 240 as soon as the data is available, and without waiting for the old context data to be completely flushed out of buffer 240. Hence, unlike the prior art parallel host adapters described above, parallel host adapter 200 does not impede flow of SCSI data. Typically, to assure adequate space in buffer 240 for at least two data contexts, buffer 240 has a size of one kilobyte.

In this embodiment, send data FIFO buffer 245 is a single data context buffer. When a send data transfer is suspended by a SCSI device on SCSI bus 120, data prefetched from the host and stored in buffer 245 is immediately purged. Thus, buffer 245 is emptied of an old context before a new context begins filling buffer 245.

In addition, parallel host adapter 200 has no way of knowing in advance which SCSI device will reconnect to resume a send data transfer. Thus, parallel host adapter 200 cannot prefetch data from the host for the next device to connect to SCSI bus 120 while the current device is still accepting data from buffer 245. Consequently, a dual context send data FIFO buffer does not offer any advantage, and so a simpler single context send data FIFO buffer 245 is utilized.

Data context controller 260 for multiple data context receive data FIFO buffer 240 can be implemented in a variety of ways. In one embodiment, a first counter counts each unit of data transferred from SCSI bus 120 to receive data FIFO buffer 240, e.g., the first counter is incremented for each unit of data transferred from SCSI bus 120 during a new data context. A second counter counts each unit of data transferred from receive data FIFO buffer 240 to PCI bus 110, e.g., the second counter is decremented for each unit of data transferred to PCI bus 110 during an old data context.

When a context switch occurs on the PCI bus, i.e., the old data context is completed, the second counter has cleared and indicates that a channel is available for use for yet another new data context from SCSI bus 120. Upon the context switch, the first counter is incremented for each unit of data transferred from SCSI bus 120 to receive data FIFO buffer 240, and decremented for each unit of data transferred from receive data FIFO buffer 240 to PCI bus 110. When the new data context ends on SCSI bus 120, the data context an old data context, and the first counter is used to count each unit of data transferred to PCI bus 110. When a new data context is initiated from SCSI bus 120, the second counter is used to count the units of data received from SCSI bus 120. Hence, in this embodiment, two counters are used in data context controller 260 to implement the at least two data context capability.

In another embodiment of data context controller 260, as a unit of data, e.g., a byte or a word of data, is stored in buffer 240, the value of a context data-in counter is changed. When the data transfer is complete, the value of the context data-in counter is stored in a data context size FIFO as a data context size.

When a data context switch signal is generated, the oldest data context size in the data context size FIFO is loaded into a context data-out counter. As each unit of data is transferred from buffer 240 to the host, the value of the context data-out counter is decremented. When the context data-out counter reaches zero, a context switch signal is generated that loads the context data-out counter with the next value in the data context size FIFO.

In yet another embodiment, buffer 240 has an extra bit in each line. For one data context, the bit is set, and for the next data context, the bit is not set. Thus, a change in the state of the extra bit indicates a context change.

In another embodiment of this invention, a parallel host adapter 300 that interfaces two I/O buses 110 and 120 includes at least three channels, an administrative information channel 201, a first bi-directional data channel 302, and a second bi-directional data channel 303.

In this embodiment, each of bi-directional data channels 302 and 303 can be utilized for either a send or a receive operation. Consequently, parallel host adapter 300 supports two receive data contexts with one in each channel, or alternatively, a simultaneous receive data context in one channel and a send data context in the other channel. In yet another embodiment, one or both of the bi-directional data channels can support more than two receive data contexts similar to the embodiment described above.

Figure 3:
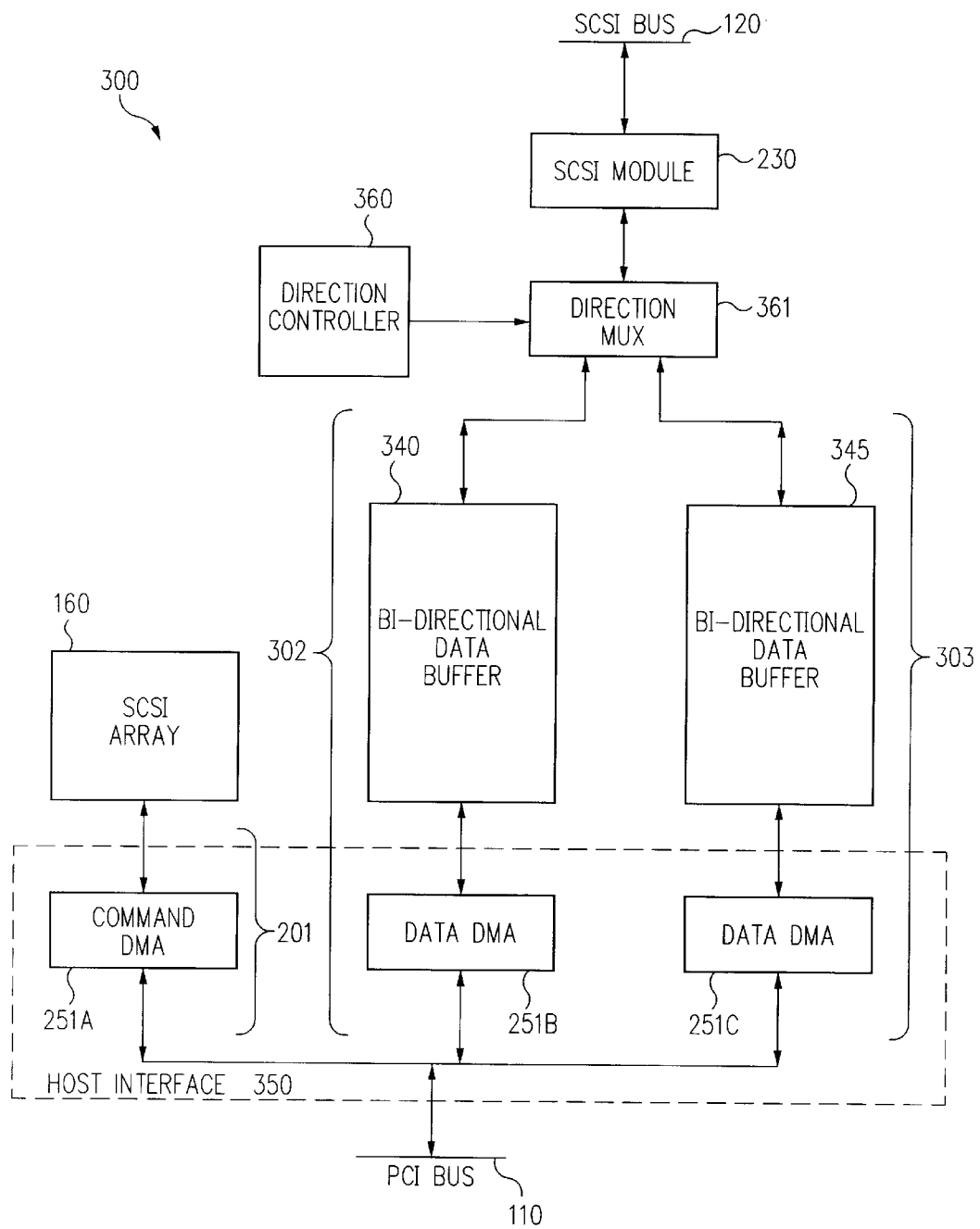
FIG. 3 is a diagram of a parallel host adapter with a second embodiment of the novel channel architecture of this invention.

While it is not illustrated in FIG. 3, those of skill in the art will appreciate that a plurality of storage devices, other host adapters, etc. may be connected to bus 120. Again, see for example FIGS. 1 to 3 of U.S. Pat. No. 5,659,690, which is incorporated herein by reference in its entirety. Those of skill in the art also will understand that parallel host adapter 300 includes other circuitry and storage that are used in the operation of parallel host adapter 300 including an on-chip sequencer that controls the operation of parallel host adapter 300. However, these components are similar to those of the prior art and so are not considered except to the extent required to implement this invention, as described more completely below. Also, the components are not shown in the drawings to avoid distracting from the features of this invention.

Administrative information channel 201 is the same as that described above and so is not considered further. In a receive operation, e.g., in a first Data In phase on SCSI bus 120, where data is transferred from SCSI bus 120 to PCI bus 110, i.e., from a second I/O bus to a first I/O bus, direction controller 360 determines which of the two bi-directional data channels 302 and 303 is idle and configures direction multiplexer 361 to connect SCSI module 230 to that channel, which in this example is bi-directional data channel 303.

Hence, SCSI module 230 passes data from SCSI bus 120 to bi-directional data FIFO buffer 345. In this embodiment, data can be transferred from bi-directional data FIFO data buffer 340 to PCI bus 110 at the same time that data is being received from SCSI bus 120 by buffer 345. Alternatively, buffer 340 could be receiving data over PCI bus 110 while data is being transferred from buffer 345 over PCI bus 110.

Therefore, it is no longer necessary for parallel host adapter 300 to wait until a receive operation has completed before initiating a send operation. The capability to handle a send operation and a receive operation in parallel, i.e., at the same time, provides a new level in performance over the prior art parallel host adapters described above.

As illustrated in FIG. 3, a data DMA engine 251B transfers data from a host over PCI bus 110 to buffer 340. Therefore, data can be immediately transferred from a host to a SCSI device without waiting for data from a device previously connected to SCSI bus 120 to finish draining from buffer 345 to the host. Old context data in buffer 345 can be draining from buffer 345 concurrently with new context data filling buffer 340 by interleaving data bursts of the two contexts on PCI bus 110.

As indicated above, to further enhance the performance of the parallel host adapter channel architecture of this invention, parallel host adapter 300 supports multiple receive data contexts. For example, in one embodiment, a first data context is flowing from buffer 340 via data DMA engine 251B to PCI bus 110, a second data context is stored in buffer 345 following the first data context.

Following a SCSI phase change out of a Data In phase, data from that phase continues to drain from receive data FIFO buffer 340 to the host over PCI bus 110. The time required to completely empty buffer 340 can be appreciable compared with the time when data from another SCSI device becomes available on SCSI bus 120. Parallel host adapter 300 enables a new context data on SCSI bus 120 to start flowing into buffer 345 as soon as the data is available, and without waiting for the old context data to be completely flushed out of buffer 340. Hence, unlike the prior art parallel host adapters described above, parallel host adapter 200 does not impede flow of SCSI data.

Data context controller 360 can be implemented in a variety of ways. In one embodiment, a first counter is incremented as each unit of data is transferred to bi-directional buffer 340, and decremented as each unit of data is removed from bi-directional buffer 340. A value of zero in the first counter indicates that channel 302 is ready for use. A second counter is incremented as each unit of data is transferred to bi-directional buffer 345, and decremented as each unit of data is removed from bi-directional buffer 345. A value of zero in the second counter indicates that channel 303 is ready for use. Thus, when direction controller 360 receives a request for use of one of the bi-directional data channels, controller 360 examines the value of each of the counters to determine whether a channel is available. If a channel is available, controller 360 configures direction multiplexer 361 appropriately.

The embodiments of the parallel host adapter with dual data channels described herein are only illustrative and are not intended to limit the invention to the specific embodiments disclosed. Also, in view of the above disclosure, those of skill in the art can implement the invention in a variety of ways that provide the dual channel performance characteristics of the parallel host adapter of this invention. For example, buffer memories 240 and 245 can be implemented using a single memory with four data ports.

I claim:

1. A parallel host adapter integrated circuit comprising:
   a first I/O bus interface circuit having a single first I/O bus data port;
   a second I/O bus interface circuit having a single second I/O bus data port;
   a first data channel coupled to said first I/O bus data port by said first I/O bus interface circuit, and coupled to said second I/O bus data port by said second I/O bus interface circuit, wherein said parallel host adapter integrated circuit uses said first data channel to transfer data between said first I/O bus data port and said second I/O bus data port; and
   a second data channel coupled to said first I/O bus data port by said first I/O bus interface circuit, and coupled to said second I/O bus data port by said second I/O bus interface circuit, wherein said parallel host adapter integrated circuit uses said second data channel to transfer data between said first I/O bus data port and said second I/O bus data port, and further wherein said first and second data channels are different channels that can be in operation at the same time.

2. A parallel host adapter integrated circuit as in claim 1 further comprising:
   an administrative information channel coupling said first I/O bus data port to a memory.

3. A parallel host adapter integrated circuit as in claim 1 wherein said first data channel is a dedicated receive channel.

4. A parallel host adapter integrated circuit as in claim 3 wherein said dedicated send channel includes a send buffer memory.

5. A parallel host adapter integrated circuit as in claim 4 wherein said receive buffer memory is at least a two data context receive buffer memory.

6. A parallel host adapter integrated circuit as in claim 1 wherein said second data channel is a dedicated send channel.

7. A parallel host adapter integrated circuit as in claim 6 wherein said dedicated send channel includes a send buffer memory.

8. A parallel host adapter integrated circuit as in claim 7 wherein said send buffer memory is a single data context buffer memory.

9. A parallel host adapter integrated circuit as in claim 1 wherein said first data channel is a bi-directional data channel.

10. A parallel host adapter integrated circuit as in claim 1 wherein said second data channel is a bi-directional data channel.

11. A parallel host adapter integrated circuit as in claim 1 wherein said first I/O bus data port is a PCI bus data port.

12. A parallel host adapter integrated circuit as in claim 1 wherein said second I/O bus data port is a SCSI bus data port.

13. A parallel host adapter integrated circuit comprising:

a SCSI bus interface module;

a first data channel coupled to said SCSI bus interface module; and a second data channel coupled to said SCSI bus interface module wherein said first and second data channels operate in parallel.

14. A parallel host adapter integrated circuit as in claim 13 wherein said first data channel further comprises:

a buffer memory having a first port coupled to said SCSI bus interface module.

15. A parallel host adapter integrated circuit as in claim 14 wherein said first data channel further comprises:

a data transfer engine coupled to a second port of said buffer memory.

16. A parallel host adapter integrated circuit as in claim 15 wherein said second data channel further comprises:

another buffer memory having a first port coupled to said SCSI bus interface module.

17. A parallel host adapter integrated circuit as in claim 16 Wherein said second data channel further comprises:

another data transfer engine coupled to a second port of said another buffer memory.

18. A parallel host adapter integrated circuit as in claim 13 wherein said second data channel further comprises:

a buffer memory having a first port coupled to said SCSI bus interface module.

19. A parallel host adapter integrated circuit as in claim 18 wherein said second data channel further comprises:

a data transfer engine coupled to a second port of said buffer memory.

20. A SCSI host adapter integrated circuit comprising:

a SCSI bus data port;

an I/O bus data port;

a SCSI module coupled to said SCSI bus data port;

a first bi-directional data buffer selectively coupled to and decoupled from said SCSI module;

a second bi-directional data buffer selectively coupled to and decoupled from said SCSI module; and an interface module coupled to said first bi-direction data buffer, to said second bi-directional data buffer and to said I/O bus data port.

21. The host adapter integrated circuit of claim 20 wherein said interface module further comprises:

a data transfer engine coupled between said first bi-directional data buffer and said I/O bus data port.

22. The host adapter integrated circuit of claim 20 wherein said interface module further comprises:

a data transfer engine coupled between said second bi-directional data buffer and said I/O bus data port.

23. The host adapter integrated circuit of claim 20 further comprising:

a direction multiplexer coupled between said SCSI module and said first and second bi-directional data buffers.

24. A host adapter integrated circuit comprising:

a SCSI bus data port;

an I/O bus data port;

a SCSI module coupled to said SCSI bus data port;

a first bi-directional data buffer selectively coupled to and decoupled from said SCSI module;

a second bi-directional data buffer selectively coupled to and decoupled from said SCSI module;

a first data transfer engine coupled between said first bi-directional data buffer and said I/O bus data port; and a second data transfer engine coupled between second bi-directional data buffer and said I/O bus data port.

25. A method for handling multiple data contexts simultaneously by a SCSI host adapter comprising:

transferring data for a first data context from a SCSI bus I/O port of said SCSI host adapter to a first buffer memory of said SCSI host adapter;

transferring said data for said first data context from said first buffer memory to another I/O bus data port of said SCSI host adapter; and transferring data for a second data context from said SCSI bus I/O port of said SCSI host adapter to a second buffer memory of said SCSI host adapter simultaneously with said transferring said data for said first data context from said first buffer memory to said another I/O bus data port of said SCSI host adapter.

26. A method for handling multiple data contexts simultaneously by a SCSI host adapter comprising:

transferring data for a first data context from a SCSI bus I/O port of said SCSI host adapter to a first buffer memory of said SCSI host adapter; and interleaving transfer of data for a second data context from another I/O bus data port of said SCSI host adapter to a second buffer memory of said SCSI host adapter with transfer of said data for said first data context from said first buffer memory to said another I/O bus data port.

27. A method for handling multiple data contexts simultaneously by a SCSI host adapter comprising:

transferring data for a first data context from a SCSI bus I/O port of said SCSI host adapter to a buffer memory of said SCSI host adapter;

transferring said data for said first data context from said buffer memory to another I/O bus data port of said SCSI host adapter; and transferring data for a second data context from said SCSI bus I/O port of said SCSI host adapter to said buffer memory simultaneously with transferring said data for said first data context to said another I/O bus data port of said SCSI host adapter.

* * * * *